Aug. 1, 1967

T. J. MISBIN ETAL 3,333,843

DOCUMENT STACKER

Filed Nov. 12, 1965

2 Sheets-Sheet 1

INVENTORS
THEODORE J. MISBIN &
DONALD M. FISHER
BY John V. Regan
Attorney

INVENTORS
THEODORE J. MISBIN &
DONALD M. FISHER
BY John V. Regan
Attorney

United States Patent Office 3,333,843

Patented Aug. 1, 1967

3,333,843

DOCUMENT STACKER

Theodore J. Misbin, Cherry Hill, and Donald M. Fisher, Haddonfield, N.J., assignors to Radio Corporation of America, a corporation of Delaware Filed Nov. 12, 1965, Ser. No. 507,293
11 Claims. (Cl. 271—71)

ABSTRACT OF THE DISCLOSURE

An apparatus is disclosed for feeding and stacking record cards on edge, with provision for preventing an incoming card from sliding across the surface of a previously stacked card. Deflectors near the entrance of the stacking area bow the central portion of an incoming card away from the stack. The top and bottom edges of the bowed card serve as rails which ride along top and bottom portions of the card most recently stacked.

*Background and description of the invention*

This invention relates to document stackers and, in particular, to improved apparatus for stacking punched cards on edge.

In many apparatuses for stacking documents on edge, an incoming document enters the stacking area, is slid along the surface or face of a previously stacked document, and comes to rest when its leading edge abuts against a wall or other stop member at the far side of the stacking area. It has been found that, when the documents are punched documents, e.g. cards, the sliding of one card along the surface of another card at high speed often results in a tearing of web areas between punches in either or both of the cards. Web tearing may arise when the trailing edge of a punch in the incoming card engages the leading edge of a punch in the previously stacked card. Tearing of a web in the previously stacked card also can arise if the leading edge of one of its punches is engaged by the leading edge of the incoming card. The likelihood of web tearing is especially prevalent when the relative movement of the cards is in a direction transverse to the card columns.

Information also may be recorded magnetically on magnetic record cards, or cards having a magnetic recording surface or area thereon. The magnetic recording surface may become scored, or a portion of the oxide coating may be removed when one card is slid along the surface of another, thereby destroying the magnetically recorded information.

It is one object of this invention to provide an improved apparatus for stacking documents on edge.

It is another object of this invention to provide an improved apparatus for stacking documents on edge, in which apparatus an incoming document is not slid along the recording area of a previously stacked document.

It is a further object of this invention to provide an improved document stacking apparatus in which the central, longitudinal portion of the incoming document is bowed away from the previously stacked document to provide a pair of "rails" which ride along the opposite edge portions of the previously stacked document.

In apparatus embodying the invention, one end of a document stacking area lies along one side of a transport path for incoming documents. First and second guide members extend along the other side of the transport path in the direction of document feed. These guide members are spaced from one another to engage and guide opposite end portions of an incoming document. Means are provided near the entrance to the stacking area for bowing the incoming document and feeding that document in a bowed condition to the guide members. The bowing means is operative to bow the document so that those of its edges which are parallel to the direction of feed are bowed toward the stacking area, and the intermediate portion of the incoming document is bowed away from the stacking area.

In the accompanying drawing, like reference numerals denote like components, and:

The overall document stacking apparatus will first be described in general terms. The important features of the system will then be described in detail. For illustrative purposes, the system will be described in connection with the feeding of punched record cards of the type commonly used in business machines.

Figures 1, 2, 3:
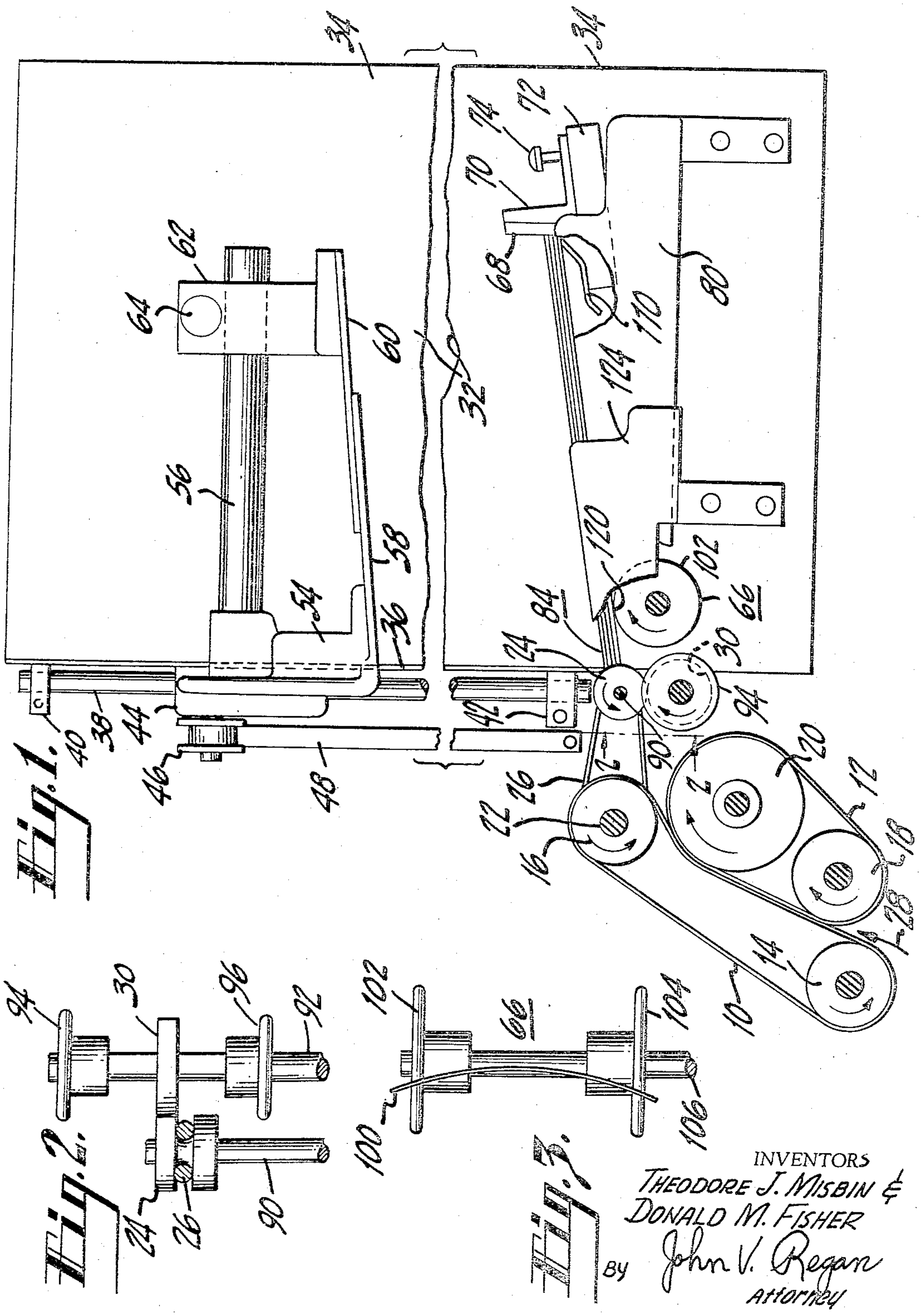
FIGURE 1 is a plan view of a document stacking apparatus embodying the invention.
FIGURE 2 is a view in side elevation, taken along the line 2—2 of FIGURE 1, of the drive assembly at the entrance to the stacking area.
FIGURE 3 is a view in side elevation of the document bowing means at the input end of the transport path.

Cards to be stacked are fed on edge, i.e. upright, into the nip formed by a pair of flat belts 10, 12 (FIGURE 1). Belt 10 extends around a pair of rollers 14 and 16, and belt 12 extends around a pair of rollers 18 and 20. Roller 20 is located so as to depress belt 10 and keep this belt under constant tension and in contact with belt 12. Although only two belts 10 and 12 are illustrated, it will be apparent to one skilled in the art that several sets of belts, one above the other may actually be employed, with an additional set of rollers for each additional belt.

Roller 20 is driven in a clockwise direction by drive means (not shown) and, in turn, drives roller 18 by means of the belt 12. The frictional contact between the belts 10 and 12 causes the belt 10 to be driven in a counterclockwise direction, in turn driving each of the rollers 14 and 16 counterclockwise. Roller 16, in turn, drives a further roller, or wheel, 24 in a counterclockwise direction by means of an O ring belt 26. The shaft 90 for roller 24 is supported on an arm (not shown) which is pivotally mounted on the shaft 22 for roller 16. This arm is spring loaded to bias roller 24 against an idler roller 30, shown in dashed lines, which is an elastomer tired wheel. Roller 30 is driven in a clockwise direction by roller 24.

Cards entering the nip between belts 10 and 12 are driven by these belts, in the direction of arrow 28, so that the leading edge of the incoming card strikes the O ring belt 26. Belt 26 deflects the card and guides it into the pinch area between rollers 24 and 30. Constant drive is imparted to the card due to the spring bias on roller 24. The pinch area between rollers 24 and 30 may be considered as defining the input throat or mouth at the entrance to the stacking area.

The stacker proper comprises a horizontal plate or table 34 which is preferably a shaker table vibrated to enhance the stacking of the cards. At the left edge thereof is an upstanding side wall 36 which extends from the back, or rear, of the stacking area to a point near the forward end adjacent roller 24. In the preferred embodiment, the height of this side wall is approximately a quarter of an inch. To the left of wall 36 is a rod 38 which is supported at its rear and forward ends by members 40 and 42, respectively. A housing 44 rides in bearings on rod 38 and has attached thereto a rotatable spool 46 on which is wound a ribbon spring 48. One end of the spring 48 is pinned at a point near the front end of the stacker. This ribbon spring 48 operates to bias housing 44 toward the front of the stacker (i.e. toward the bottom of FIGURE 1).

Integral with housing 44 is an arm 54 which projects above side wall 36 and carries a horizontal rod 56 near its back end. Pinned at the front end of arm 54 is a first plate 58, which serves as one part of a backing member, or backing plate, for stacked documents. A second plate 60 forms another part of the overall backing member, and is mounted on a block 62 which is slidably mounted on rod 56. A knurled knob cam lock 64 is provided for tightening block 62 on rod 56 and holding it in fixed position. The purpose of plate 60 and its accompanying element is to provide a backing member of adjustable length so as to accommodate documents of different size. Ordinarily, ribbon spring 48 biases housing 44 and, hence, the backing plate toward the front of the stacking area so that the forwardmost card in the stack is adjacent a roller assembly 66. However, for clarity of drawing, the entire backing plate assembly is shown removed from the front of the stacking area.

The incoming cards to be stacked are fed along a transport path at the front end of the stacking area. Essentially, the stacking area 32 may be considered as forming, or extending along, a first side of the transport path. Across the end of this path is a stop member 68 against which the leading edges of the incoming cards are driven. The position of this stop member 68 is adjustable to accommodate documents of different length. For example, the stop member 68 may be affixed to an arm 70 which is slidably mounted on a block 72. To change the position of the stop member 68 and move it to a different position along the transport path, the operator loosens a thumb-screw 74 and slides the arm 70 along block 72 to the desired position. Thumb-screw 74 then is tightened to hold the assembly in this position.

Figure 5:
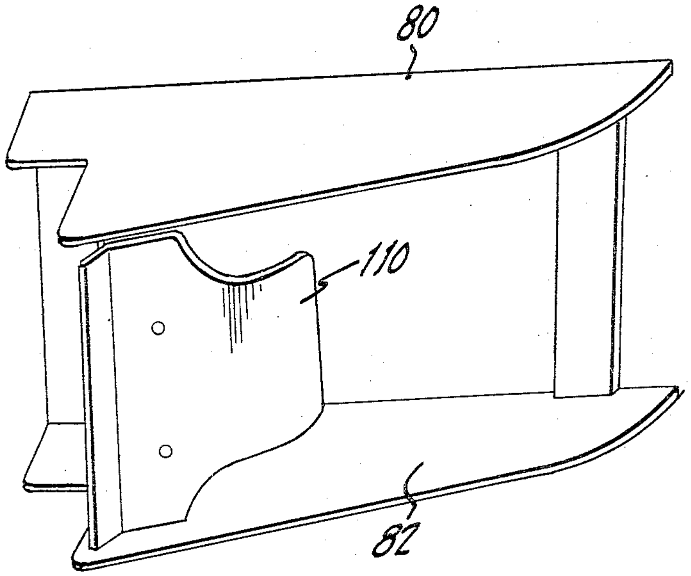
FIGURE 5 is a perspective view of the document guide members.

Located on the second side of the transport path, near the entrance to the stacking area, is a roller assembly 66, which will be described in greater detail hereinafter. Roller assembly 66 is rotated in a clockwise direction by means which are not shown in the drawing. A pair of upper and lower guide members 80, 82 (best seen in FIGURE 5) extend along the second side of the transport path, and guide an incoming card to the stop member 68. These guide members are located one above the other and are so spaced vertically, relative to the stacker plate 34, as to engage the incoming card near its top and bottom edges.

If the incoming card were to enter the stacking area in a flat condition, the leading edge of the incoming card would ride along the front surface of the forwardmost one of the cards 84 previously stacked in the stacking area, as if on a washboard surface due to the punched areas in the stacked card. Moreover, after the leading edge of the incoming card had passed the roller assembly 66, the entire surface of the incoming card between roller assembly 66 and the leading edge of that card would slide along in contact with the surface of the previously stacked card. It has been found that such sliding movement of the cards frequently results in torn webs, where a web may be defined as that portion of a card between adjacent punched holes therein.

Tearing of webs arises when the leading edge of the incoming card engages the leading edge of a punched hole in the stacked card, or when the trailing edges of the punched holes in the incoming card engage the leading edges of the punched holes in the previously stacked card. Tearing of webs is avoided in the present arrangement by bowing the incoming card in such a direction that the top and bottom edges of the incoming card are bowed toward the forwardmost document in the stack, and the central portion of the incoming card, between the top and bottom edges, is bowed away from the stacked card. Such bowing of the incoming card essentially results in a pair of "rails" (the top and bottom edges of the card) which ride along top and bottom surface portions of the previously stacked card.

The incoming card is bowed an amount whereby the top and bottom edges thereof ride along those top and bottom portions of the previously stacked card at locations in which no perforations ever appear. In particular, if the cards are of the usual type which contain twelve rows of index point positions which may be punched, the bowed card contacts the previously stacked card in the areas above and below the first and last rows of index point positions. The manner in which this bowing action is effected in the present apparatus will now be described.

Drive rollers 24 and 30, located at the entrance to the stacking area, are shown in side elevation in FIGURE 2. Roller 24 is mounted on a shaft 90 and driven by the O ring belt 26. Roller 30 is mounted on a shaft 92 opposite roller 24. As mentioned previously, driven roller 24 is spring loaded against roller 30 and drives roller 30. Also mounted on upright shaft 92 are two other rollers 94 and 96, one above and one below roller 30, respectively. Rollers 94 and 96 are so spaced relative to each other as to engage the surface of the incoming card at locations near the top and bottom edges thereof. In particular, assuming that a card has twelve rows of punches designated rows 1 through 12 in that order, roller 94 may be positioned on shaft 92 so as to engage a card in the land area between rows 1 and 2, and roller 96 may be positioned to engage a card in the land area between rows 11 and 12. The diameters of rollers 94 and 96 are equal to each other, but are greater than the diameter of roller 30. Accordingly, when a card is driven into the pinch area between rollers 24 and 30 and fed therethrough, rollers 92 and 94 cause the incoming card to bow. The bow is in such a direction that the top and bottom edges of the card are bowed toward the left in FIGURE 2.

As may be seen in the plan view of FIGURE 1, the leading edge of an incoming card is driven against the side of roller assembly 66 by the rollers 24 and 30. Roller assembly 66 is shown in left side elevation in FIGURE 3. Also shown in FIGURE 3 is the leading edge of incoming card 100 as it abuts the roller assembly 66.

Roller assembly 66 comprises a pair of rollers 102 and 104 mounted on a common upright shaft 106. As may be seen in FIGURE 3, there is a large void area between the inner, opposed faces of these rollers into which the central portion of an incoming, bowed card may project. The spacing between rollers 102 and 104 is slightly greater than the spacing between rollers 94 and 96 (FIGURE 2). Preferably, roller 102 is located vertically on shaft 106 at a position to engage an incoming card in the area between the top edge of the card and row 1 thereon. Roller 104 is positioned to engage the incoming card in the area between row 12 and the bottom edge of the card. The guide surfaces of members 80 and 82 (FIGURE 5) are at the same elevations as rollers 102 and 104, respectively, and are thus aligned therewith.

Referring again to FIGURE 1, it may be seen that roller assembly 66 changes the direction of travel of the incoming card and drives the card in an upward direction (toward the top of the drawing) into the stacking area. As the leading edge of the incoming document reaches the roller assembly 66, rollers 102 and 104 (FIGURE 3) contact the card near the top and bottom of its leading edge, and deflect these edges toward the stack. Because the card is being driven by rollers 24 and 30, the central leading edge portion of the card tends to continue moving toward the assembly 66, whereby the central leading edge portion moves into the space between rollers 102 and 104 as the upper and lower edges of the card are deflected.

As a result of this action, the bow of the card is increased. The bow is in such a direction that the top and bottom edges of the card are bowed toward the stack, and the central portion of the card is bowed away from the stack and into the area between rollers 102 and 104. It should be mentioned that the roller assembly 66 would bow the card in the manner aforementioned even if the card were not fed to this assembly in a slightly bowed condition.

Figure 4:
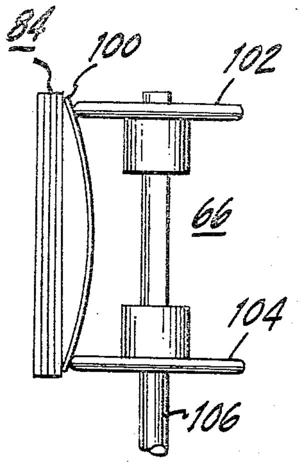
FIGURE 4 is a view in side elevation of the document bowing means and the forwardmost documents in the stack, and illustrating the manner in which the bowed document is fed into the stack.

Bowing the incoming card 100 essentially results in a pair of "rails" at the top and bottom edges thereof. These rails ride along the face of the forwardmost stacked card in the unpunched areas near the top and bottom thereof, i.e. the area between the top edge and row 1 and the area between the bottom edge and row 12. This may be seen in FIGURE 4, which is a view in left side elevation of roller assembly 66, the stacked documents 84 and the incoming card 100. Bowing the card also adds stiffness to the card which helps to resist unbowing as the card is slid along the forwardmost stacked card.

As may be seen in FIGURE 1, roller assembly 66 is located slightly to the right of side wall 36. Accordingly, the leading edge of the incoming card does not contact the trailing edge of the forwardmost one of the previously stacked cards.

Roller assembly 66 drives the bowed card along the guide members 80, 82 to the stop member 68. The bow of the card is maintained until the card approaches close to the stop member, at which time it becomes unbowed by the action of a third guide member 110, shown in the cutout in FIGURE 1. The guide member assembly is shown in enlarged perspective view in FIGURE 5. Upper and lower guide members 80 and 82 are aligned with the rollers 102 and 104 of roller assembly 66 and contact the incoming card in the areas between the top edge and row 1, and between the bottom edge and row 12. As the incoming card is guided along the guide members 80, 82, the central portion of the incoming card is bowed into the space between these guide members.

Located between the upper and lower guide members 80 and 82, near the stop member 68, is the third guide member 110. The forward, or left, end of this guide member 110, as viewed in FIGURE 1, is positioned to engage the central portion of the incoming card at its leading edge. Guide member 110 guides the central portion of the card as the card moves along the transport path and, at a location near the stop member 68, guides the central portion of the card toward the transport path. In particular, the right end of third guide member 110 deflects the central, leading edge of the incoming card to the stop member 68 substantially in alignment with the top and bottom leading edge portions thereof. Thus, guide member 110 serves the function essentially of unbowing the incoming card as it reaches a point along the transport path close to the stop member 68.

Enhanced stacking operation results when the guide surfaces of members 80 and 82 and the point 120 of tangency of roller assembly 66 and the forwardmost document lie in a plane which either intersects the axis of roller 24 or lies slightly back of that axis, as viewed in FIGURE 1. The roller 24 extends over the side wall 36 by approximately 1/16 of an inch. When this physical relationship is established, roller 24 serves to drive the trailing edge of the incoming card toward the rear of the stacking area (i.e. away from roller 30), out of the entry path to the stacking area, whereby the leading edge of the next incoming card cannot strike the previous card at its trailing edge. So locating the roller 24 with respect to the side wall 36 also serves to improve the uniformity of stacking by helping to assure that the trailing edges of all of the stacked cards are aligned.

Although it may not be apparent from FIGURE 1, the backing plate 58, 60 for the stacked cards is oblique to the transport path at the front of the stacking area 32. In particular, the backing plate 58, 60 is closer to the guide members 80, 82 than it is to the roller assembly 66 for any given position of the backing member. By this means, unduly large pressure of the stacked cards against the roller assembly 66 is avoided, and there is thus little tendency of the stacked cards to unbow the incoming card as it passes the roller assembly 66.

An additional guide member 124, shown in partial view in FIGURE 1, overlies roller assembly 66 and the left end of upper guide member 80. Guide member 124 is elevated above the stacker plate 34 a distance equal to the height of the incoming cards plus approximately 1/32 of an inch, and serves to assure that the bottom edge of each incoming card rests on the stacker plate 34. This assures that the incoming card always properly contacts roller member 66 and guide members 80, 82 and also serves to improve uniformity of stacking of the cards so that the top edges thereof lie in a horizontal plane.

What is claimed is:

1. Apparatus for receiving and stacking documents on edge, comprising:

a document stacking area having a transport path along one end thereof for incoming documents;

upper and lower guide members facing said stacking area and extending along one side of said path, said guide members being located one above the other and being spaced to guide upper and lower portions, respectively, of an incoming document;

upper and lower drive rollers located on said one side of said path, near the entrance to said stacking area, said upper and lower drive rollers being spaced to engage an incoming document near its top and bottom edges, respectively; and means for feeding an incoming document, on edge, to said drive rollers with the leading edge of the document abutting said rollers at such an angle as to bow the central portion of said document toward the axes of said rollers, whereby the top and bottom edges of the bowed document serve as rails which may ride along top and bottom surface portions of that one of the previously stacked documents which is closest to said one end of said stacking area.

2. Apparatus as claimed in claim 1, including a movable document backing member in said stacking area and means urging said backing member toward said one end of said stacking area, said backing member being oblique to said transport path and being closer to said guide members than to said drive rollers for any given position of the backing member.

3. Apparatus as claimed in claim 1, wherein the guide surfaces of said upper and lower guide members, in the main, lie in a plane that is substantially tangent to those portions of said drive rollers which are closest to said transport path.

4. Apparatus as claimed in claim 1, including a wall disposed across the end of the transport path and against which the leading edge of the incoming document is guided by said upper and lower guide members.

5. The apparatus as claimed in claim 4, including means for unbowing the incoming document as its leading edge nears said wall, said means comprising a third guide member located near said wall and being disposed to deflect the central portion of the incoming document toward said transport path.

6. The apparatus claimed in claim 1, wherein said means for feeding comprises: a third drive roller adjacent the entrance to said stacking area, said third roller being located to engage an incoming document intermediate the top and bottom edges thereof; fourth, fifth and sixth rollers mounted on a common, upright shaft, with the fourth roller being disposed opposite the third roller and cooperating therewith to drive an incoming document to said first and second rollers, the pinch between said third and fourth rollers forming an input throat to the stacking area; and said fifth and sixth rollers being located one above and one below said fourth roller and each having a larger diameter than said fourth roller, whereby they bow the incoming document before it is fed to said first and second rollers.

7. The apparatus as claimed in claim 6, wherein the guide surfaces of said guide members lie in a first plane that is substantially tangent to those portions of the first and second rollers which are closest to said transport path, and wherein said plane is close to the axis of said third roller.

8. The apparatus as claimed in claim 6, wherein the trailing edges of documents stacked in said stacking area lie in a second plane which is substantially tangent to said third roller at a point thereon which faces said stacking area.

9. The apparatus as claimed in claim 6, including a movable document backing member in said stacking area and means for urging said backing member toward said one end of said stacking area, said backing member being oblique to said transport path and being closer to said guide members than to said first and second rollers for any given position of the backing member.

10. The apparatus as claimed in claim 9, including a wall disposed across the end of the transport path and against which the leading edge of the incoming document is driven by said first and second rollers and guided by said upper and lower guide members, and means located near said wall for unbowing the incoming document as its leading edge nears said wall.

11. Apparatus for receiving and stacking documents on edge, comprising:

a document stacking area having a transport path along one end thereof for incoming documents;

upper and lower guide members facing said stacking area and extending along one side of said path, said upper and lower guide members being located one above the other and being spaced to guide upper and lower portions, respectively, of an incoming document;

upper and lower deflectors on said one side of said path, near the entrance to said stacking area, positioned to deflect the leading edge of an incoming document into said stacking area, said upper and lower deflectors being spaced apart to engage an incoming document near its top and bottom edges, respectively; and means for feeding an incoming document against said upper and lower deflectors with the leading edge of the document striking said deflectors at such an angle as to bow the central portion of the document, between the top and bottom edges thereof, into the area between said deflectors, whereby the top and bottom edges of the bowed documents serve as rails which may ride along the top and bottom surface portions of that one of the previously stacked documents which is closest to said one end of said stacking area.

References Cited

UNITED STATES PATENTS

| | | | |
|---|---|---|---|
| 3,101,942 | 8/1963 | Zyber | 271—68 |
| 3,182,821 | 5/1965 | Parker | 271—71 X |

M. HENSON WOOD, Jr., *Primary Examiner.*

R. A. SCHACHER, *Assistant Examiner.*